(12) United States Patent
Cheng

(10) Patent No.: US 8,902,555 B2
(45) Date of Patent: Dec. 2, 2014

(54) SMART ALARM PLUG, SOCKET, WALL-MOUNTED SOCKET OR CONNECTOR

(71) Applicant: Chi Wen Cheng, Dong Guan (CN)

(72) Inventor: Chi Wen Cheng, Dong Guan (CN)

( * ) Notice: Subject to any disclaimer, the term of this patent is extended or adjusted under 35 U.S.C. 154(b) by 114 days.

(21) Appl. No.: 13/859,693

(22) Filed: Apr. 9, 2013

(65) Prior Publication Data

US 2014/0302717 A1    Oct. 9, 2014

(51) Int. Cl.
*H02H 3/00* (2006.01)
*H01R 13/713* (2006.01)
*H02H 5/04* (2006.01)

(52) U.S. Cl.
CPC ............ *H01R 13/7137* (2013.01); *H02H 5/04* (2013.01); *H02H 5/047* (2013.01)
USPC ............................................. 361/103; 361/42

(58) Field of Classification Search
USPC .......................................... 361/42, 103, 106
See application file for complete search history.

(56) References Cited

U.S. PATENT DOCUMENTS

| 5,600,306 A * | 2/1997 | Ichikawa et al. ............... 340/584 |
| 2011/0134578 A1 * | 6/2011 | Ward et al. ..................... 361/103 |

* cited by examiner

*Primary Examiner* — Danny Nguyen

(57) ABSTRACT

A smart alarm plug, socket, wall-mounted socket or connector includes a casing, a normally-open temperature control switch, a normally-closed temperature control switch and an alarm device. The casing is provided with a live wire pin, a neutral wire pin, an earth wire pin, and connecting core wires. The heat resistance value of the normally-closed temperature control switch is greater than the heat resistance value of the normally-open temperature control switch. When the temperature of the power wire is abnormal, the normally-open temperature control switch will be closed for the alarm device to connect with the power, such that the alarm device sends an alarm signal to warn the user to examine the circuit, providing a warning effect. When the temperature is over the preset value, the normally-closed temperature control switch will be opened to cut off power supply, achieving a fire alarm effect.

8 Claims, 5 Drawing Sheets

SMART ALARM PLUG, SOCKET, WALL-MOUNTED SOCKET OR CONNECTOR

BACKGROUND OF THE INVENTION

1. Field of the Invention

The present invention relates to a smart alarm plug, socket, wall-mounted socket or connector, and more particularly to a self-protection smart alarm plug, socket, wall-mounted socket or connector to prevent it from overheating or overloading.

2. Description of the Prior Art

A power plug is widely used in various fields. In general, the power plug can be used after connecting with a power wire. According to different purposes, the power plug can be applied to 250V, 125V, 36V voltage and 16A, 13A, 10A, 5A, 2.5A electric current.

The power plug, socket, wall-mounted plug or connector can be used widely. When electricity is required, the plug and socked are also required. It is thus clear that the power plug and socket are used throughout.

In order to prevent the power plug, socket, wall-mounted plug or connector from overloading and a short circuit, the conventional power plug is provided with an overloading protector or a fuse or a grounding electric leakage protector. However, the overloading protector or the fuse or the grounding electric leakage protector only provides overloading and electric leakage protection effects. When the circuit is abnormal, the overloading protector or the fuse or the grounding electric leakage protector will direct cut off the power, without a warning function. It is inconvenient for use, for example, the computer is damaged. In our daily life, electricity is not safe because the plug or socket is overheated to melt the insulation glue and catch fire. This overheating may be caused by bad contact, overloading or humidity.

Accordingly, the inventor of the present invention has devoted himself based on his many years of practical experiences to solve these problems.

SUMMARY OF THE INVENTION

The primary object of the present invention is to provide a smart alarm plug, socket, wall-mounted socket or connector to overcome the aforesaid shortcomings of the prior art. The present invention is smart to monitor abnormal heat, humidity or malfunction of the plug or socket, providing warning and protection effects and great convenience for the user.

In order to achieve the aforesaid object, the smart alarm plug, socket, wall-mounted socket or connector of the present invention comprises a casing, a normally-open temperature control switch which is reset automatically, a normally-closed temperature control switch which is reset manually, and an alarm device which is used to send an alarm signal.

The casing is provided with a live wire pin, a neutral wire pin, a live wire connecting core wire and a neutral wire connecting core wire. The live wire pin is connected with the live wire connecting core wire. The neutral wire pin is connected with the neutral wire connecting core wire.

The normally-open temperature control switch is disposed in the casing. The normally-open temperature control switch is connected between the live wire pin and the neutral wire pin.

The normally-closed temperature control switch is disposed in the casing. The normally-closed temperature control switch is connected in series between the live wire pin and the live wire connecting core wire or between the neutral wire pin and the neutral wire connecting core wire. The normally-closed temperature control switch has a heat resistance value greater than that of the normally-open temperature control switch.

The alarm device is disposed on the casing and connected in series with the normally-open temperature control switch.

The present invention comprises the normally-open temperature control switch and the normally-closed temperature control switch, and the heat resistance value of the normally-closed temperature control switch is greater than the heat resistance value of the normally-open temperature control switch. When the plug is overloaded, misused or aging to cause a rise in temperature of a terminal or a power wire, the normally-open temperature control switch will be closed for the alarm device to connect with the power, such that the alarm device sends an alarm signal to warn the user to examine the circuit, providing a warning effect. If the situation is not handled and when the temperature is over the preset value, the normally-closed temperature control switch will be opened to cut off power supply, achieving a fire alarm effect. If the abnormality is not relieved, the reset won't happen. After the plug is unplugged or the load of the circuit is unloaded, it will restore for normal use so the product is safe for use. The present invention is smart to monitor abnormal heat, humidity or malfunction of the plug or socket, providing warning and protection effects and great convenience for the user.

Preferably, through the normally-open temperature control switch attached to the outer side of the rear end of the neutral wire pin and the normally-closed temperature control switch attached to the outer side of the rear end of the live wire pin, the normally-open temperature control switch and the normally-closed temperature control switch can greatly enhance the sensitivity to detect a rise in temperature and react quickly and exactly to protect the electric equipment.

Preferably, the normally-open temperature control switch, the normally-closed temperature control switch and the alarm device are disposed in the integrated box and the rear end of the live wire pin is located in the integrated box, such that the normally-open temperature control switch, the normally-closed temperature control switch and the alarm device can be protected well.

Preferably, the normally-open temperature control switch and the normally-closed temperature control switch are encapsulated together to form an integral temperature control switch. The integral temperature control switch is attached to the outer side of the rear end of the live wire pin, so that the integral temperature control switch can quickly detect an abnormal rise in temperature and the product can be manufactured and assembled conveniently.

DETAILED DESCRIPTION OF THE PREFERRED EMBODIMENTS

Embodiments of the present invention will now be described, by way of example only, with reference to the accompanying drawings.

Figure 1:
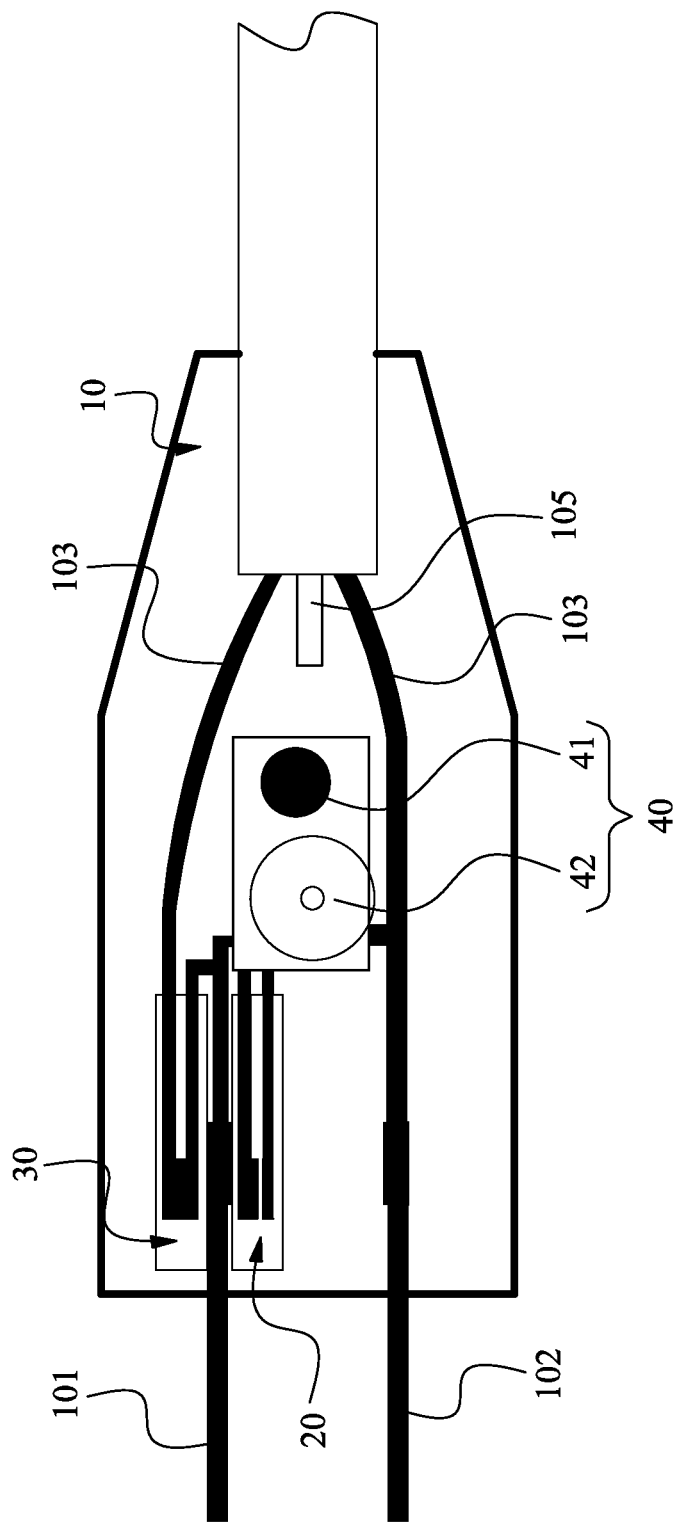
FIG. 1 is a schematic view according to a first embodiment of the present invention.
Figure 5:
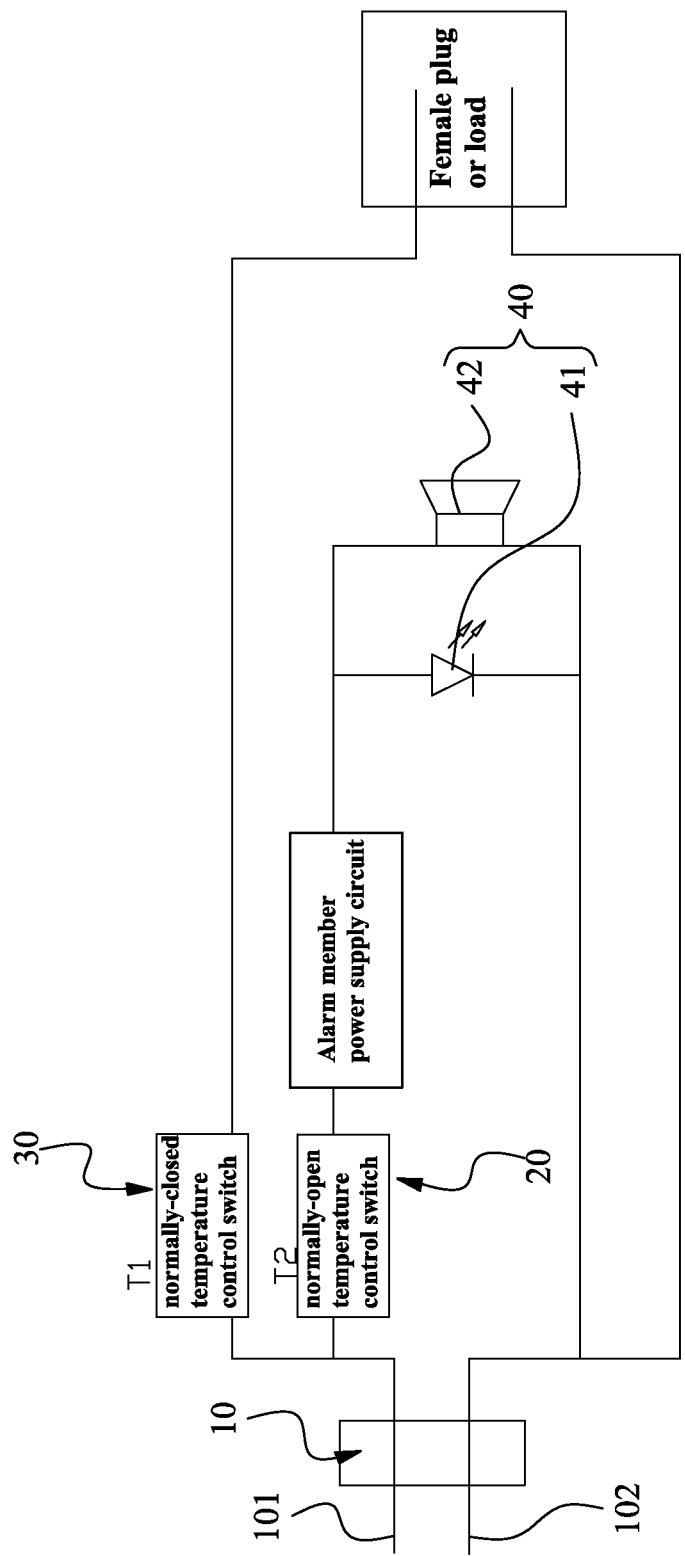
FIG. 5 is a diagram to show the circuit of the embodiments of the present invention.

FIG. 1 and FIG. 5 show a preferred embodiment of the present invention. In this embodiment, a plug is as an example but not limit, it can be a socket, a wall-mounted socket or a connector. In this embodiment, the plug comprises a casing 10, a normally-open temperature control switch 20 which is reset automatically, a normally-closed temperature control switch 30 which is reset manually, and an alarm device 40 which is used to send an alarm signal.

The casing 10 is provided with a live wire pin 101, a neutral wire pin 102, an earth line pin (not shown in the drawings), a live wire connecting core wire 103, a neutral wire connecting core wire 104, and an earth wire connecting core wire 105. The live wire pin 101 is connected with the live wire connecting core wire 103. The neutral wire pin 102 is connected with the neutral wire connecting core wire 104. The earth wire pin is connected with the earth wire connecting core wire 105. The live wire pin 101, the neutral wire pin 102 and the earth wire pin are used to connect with an external power socket. The live wire connecting core wire 103 and the neutral wire connecting core wire 104 are used to connect with an external female plug or a load.

The normally-open temperature control switch 20 is disposed in the casing 10. The normally-open temperature control switch 20 is connected between the live wire pin 101 and the neutral wire pin 102. In a normal temperature state, the normally-open temperature control switch 20 is open so that the live wire pin 101 and the neutral wire pin 102 cannot conduct through the normally-open temperature control switch 20. When the temperature reaches a preset value, the normally-open temperature control switch 20 will be closed so that the live wire pin 101 and the neutral wire pin 102 can conduct through the normally-open temperature control switch 20.

The normally-closed temperature control switch 30 is disposed in the casing 10. The normally-closed temperature control switch 30 is connected in series between the live wire pin 101 and the live wire connecting core wire 103 or between the neutral wire pin 102 and the neutral wire connecting core wire 104. In this embodiment, the normally-closed temperature control switch 30 is connected in series between the live wire pin 101 and the live wire connecting core wire 103, but not limited to this connection. In a normal temperature state, the normally-closed temperature control switch 30 is closed so that the live wire pin 101 and the live wire connecting core wire 103 can conduct through the normally-closed temperature control switch 30. When the temperature reaches a preset value, the normally-closed temperature control switch 30 will be opened so that the live wire pin 101 and the live wire connecting core wire 103 cannot conduct through the normally-closed temperature control switch 30. The normally-closed temperature control switch 30 has a heat resistance value greater than that of the normally-open temperature control switch 20. Preferably, in this embodiment, the heat resistance value of the normally-open temperature control switch 20 is 55-65° C., and the heat-resistance value of the normally-closed temperature control switch 30 is 70-85° C.

The alarm device 40 is disposed on the casing 10 and connected in series with the normally-open temperature control switch 20. Preferably, the alarm device 40 comprises an alarm member and a power supply circuit. In this embodiment, the alarm device 40 comprises a light emitted diode (LED) 41 and a buzzer 42. The aforesaid circuit supplies power to the LED 41 and/or the buzzer 42. The LED 41 and the buzzer 42 are connected in series. The LED 41 may be disposed in the casing 10 or exposed out of the casing 10. If the LED 41 is disposed in the casing 10, the casing 10 may be made of a transparent material for the light to be emitted and seen. If the LED 41 is exposed out of the casing 10, the casing 10 may be made of a transparent or non-transparent material. When the LED 41 is electrified, the LED 41 will twinkle to warn the user. When the buzzer 42 is electrified, the buzzer 42 will sound to warn the user. The alarm device may be one of the LED 41 and the buzzer 42, but not limited.

Furthermore, the normally-open temperature control switch 20, the normally-closed temperature control switch 30 and the alarm device 40 are formed in the casing 10 by injection or assembly. The normally-open temperature control switch 20 and the normally-closed temperature control switch 30 are respectively attached to two sides of the rear end of the live wire pin 101. The normally-open temperature control switch 20 and the normally-closed temperature control switch 30 can instantaneously detect the temperature of the live wire pin 101.

The working principle of the embodiment is described in detail as follow:

When in use, the rear ends of the live wire connecting core wire 103 and the neutral wire connecting core wire 104 are connected with the female plug or the load. The live wire pin 101 and the neutral wire pin 102 are plugged to the external power socket. The electric current flows from the live wire pin 101, through the normally-closed temperature control 30 and the live wire connecting core wire 103, to the female plug or the load, and then the electric current flows back from the female plug or the load through the neutral wire connecting core wire 104 to the neutral wire pin 102 to form the power circuit.

When the plug is overloaded, misused or aging to cause a rise in temperature of the live wire pin 101, the neutral wire pin 102, the live wire connecting core wire 103 and the neutral wire connecting core wire 104, the normally-open temperature control switch 20 will be closed to conduct when the normally-open temperature control switch 20 detects that the temperature rises to 55-65° C. The normally-open temperature control switch 20 is first closed to conduct, and then the alarm device 40 is turned on. After that, the alarm device 40 sends an alarm signal, namely, the LED 40 twinkles and/or the buzzers 42 sounds to warn the user of abnormal circuit. When the normally-closed temperature control switch 30 detects that the temperature rises to 70-85° C. or the current reaches 1000 A instantaneously, the normally-closed temperature control switch 30 will direct cut off the power supply to prevent the temperature from rising continuously to catch fire. If the abnormality is not relieved, the reset won't happen. After the plug is unplugged or the load of the circuit is unloaded, it will restore for normal use.

Figure 2:
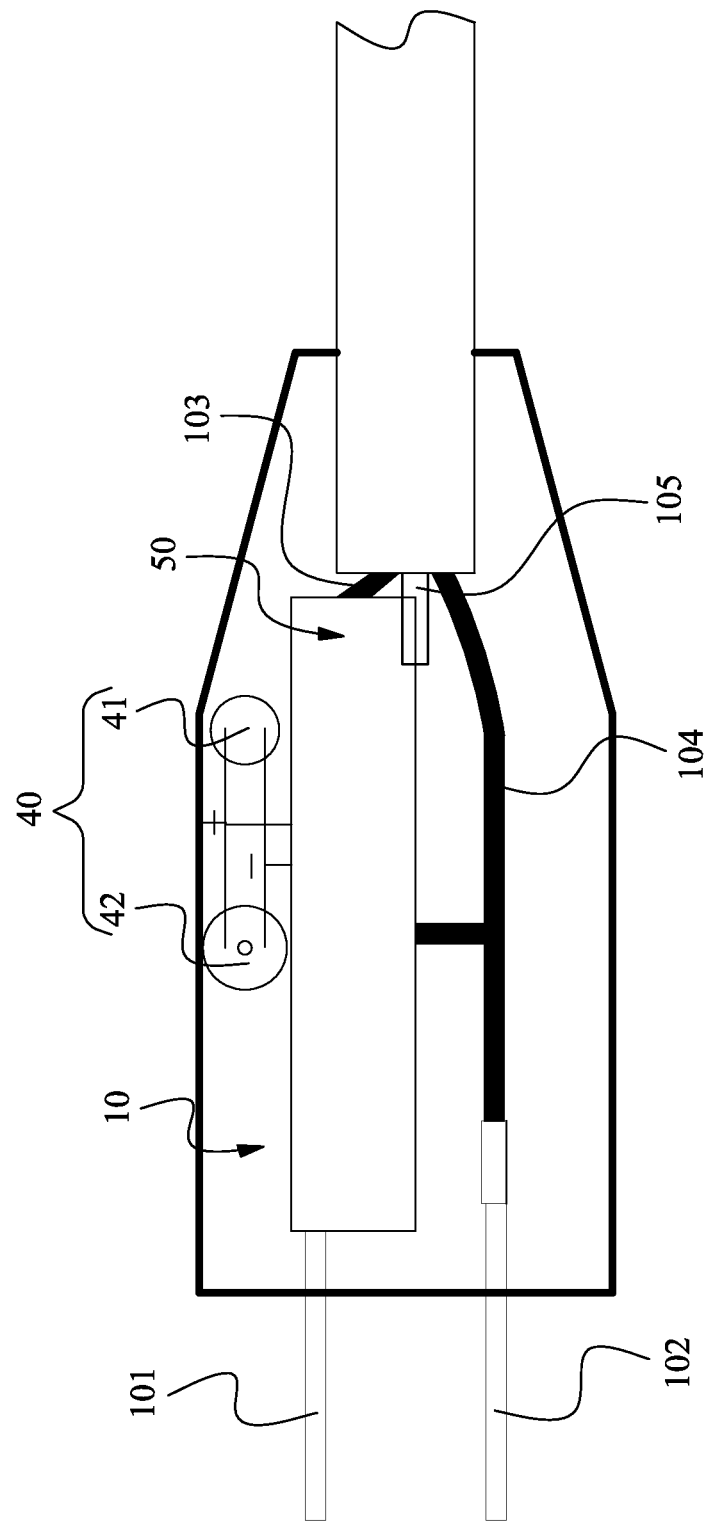
FIG. 2 is a schematic view according to a second embodiment of the present invention.

As shown in FIG. 2 and FIG. 5, a second embodiment of the present invention is substantially similar to the first embodiment with exceptions described hereinafter.

In this embodiment, the casing 10 comprises an integrated box 50 therein. The rear end of the live wire pin 101 is located in the integrated box 50. The normally-open temperature control switch 20, the normally-closed temperature control switch 30 and a portion (circuit member) of the alarm device 40 are disposed in the integrated box 50 so as to protect the normally-open temperature control switch 20, the normally-closed temperature control switch 30 and the alarm device 40 well. The normally-open temperature control switch 20 and the normally-closed temperature control switch 30 can detect the temperature of the live wire pin 101. Another portion (the portion is able to send a signal, namely, the LED 41 and/or the buzzer 42) of the alarm device 40 is located out of the integrated box 50.

The working principle of this embodiment is the same as that of the first embodiment so the working principle of this embodiment won't be described in detail hereinafter.

Figure 3:
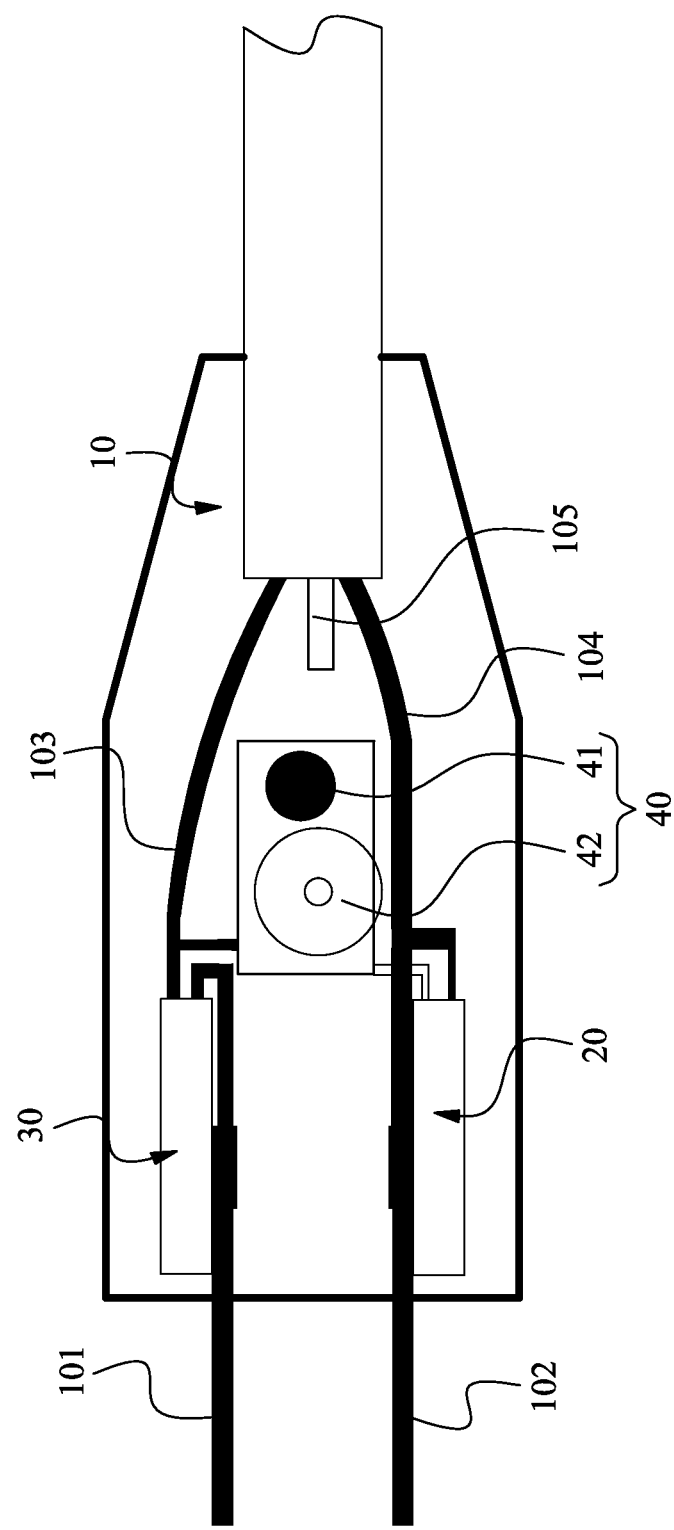
FIG. 3 is a schematic view according to a third embodiment of the present invention.

As shown in FIG. 3 and FIG. 5, a third embodiment of the present invention is substantially similar to the first embodiment with exceptions described hereinafter.

In this embodiment, the normally-open temperature control switch 20 is attached to the outer side of the rear end of the neutral wire pin 102. The normally-open temperature control switch 20 can direct detect the temperature of the neutral wire pin 102. The normally-closed temperature control switch 30 is attached to the outer side of the rear end of the live wire pin 101. The normally-closed temperature control switch 30 can direct detect the temperature of the live wire pin 101. The alarm device 40 is located between the normally-open temperature control switch 20 and the normally-closed temperature control switch 30.

The working principle of this embodiment is the same as that of the first embodiment so the working principle of this embodiment won't be described in detail hereinafter.

Figure 4:
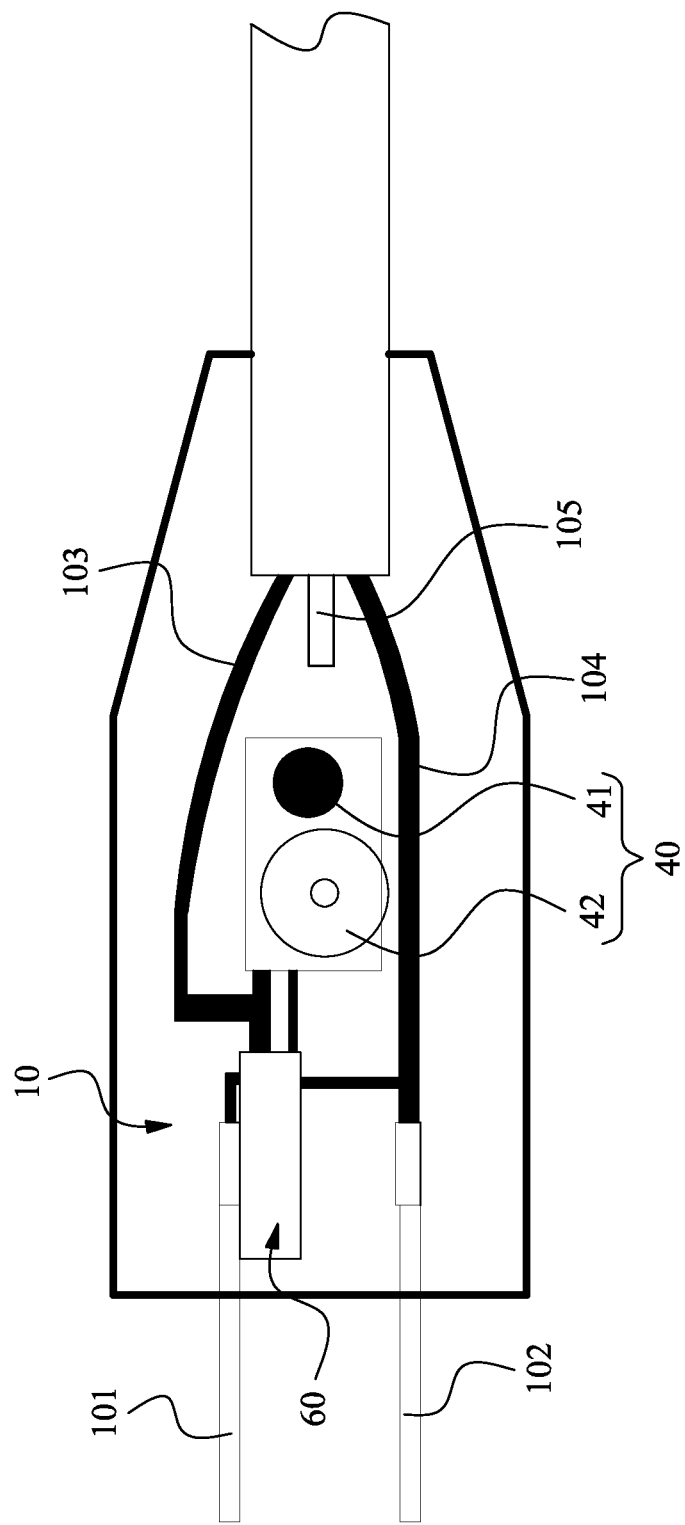
FIG. 4 is a schematic view according to a fourth embodiment of the present invention.

As shown in FIG. 4 and FIG. 5, a fourth embodiment of the present invention is substantially similar to the first embodiment with exceptions described hereinafter.

In this embodiment, the normally-open temperature control switch 20 and the normally-closed temperature control switch 30 are encapsulated together to form an integral temperature control switch 60. The integral temperature control switch 60 is attached to the outer side of the rear end of the live wire pin 101, so that the integral temperature control switch 60 can quickly detect the temperature of the live wire pin 101, alternatively, the integral temperature control switch 60 is attached to the outer side of the rear end of the neutral wire pin 102, but not limited.

The working principle of this embodiment is the same as that of the first embodiment so the working principle of this embodiment won't be described in detail hereinafter.

First, the feature of the present invention is that the normally-open temperature control switch and the normally-closed temperature control switch are provided and that the heat resistance value of the normally-closed temperature control switch is greater than the heat resistance value of the normally-open temperature control switch. When the plug is overloaded, misused or aging to cause a rise in temperature of a terminal or the power wire, the normally-open temperature control switch will be closed for the alarm device to connect with the power, such that the alarm device sends an alarm signal to warn the user to examine the circuit, providing a warning effect. If the situation is not handled and when the temperature is over the preset value, the normally-closed temperature control switch will be opened to cut off power supply, achieving a fire alarm effect. If the abnormality is not relieved, the reset won't happen. After the plug is unplugged or the load of the circuit is unloaded, it will restore for normal use so the product is safe for use. The present invention is smart to monitor abnormal heat, humidity or malfunction of the plug or socket, providing warning and protection effects and great convenience for the user. Secondly, through the normally-open temperature control switch attached to the outer side of the rear end of the neutral wire pin and the normally-closed temperature control switch attached to the outer side of the rear end of the live wire pin, the normally-open temperature control switch and the normally-closed temperature control switch can greatly enhance the sensitivity to detect a rise in temperature and react quickly and exactly to protect the electric equipment. Furthermore, The normally-open temperature control switch, the normally-closed temperature control switch and the alarm device are disposed in the integrated box and the rear end of the live wire pin is located in the integrated box, such that the normally-open temperature control switch, the normally-closed temperature control switch and the alarm device can be protected well. Finally, the normally-open temperature control switch and the normally-closed temperature control switch are encapsulated together to form an integral temperature control switch. The integral temperature control switch is attached to the outer side of the rear end of the live wire pin, so that the integral temperature control switch can quickly detect an abnormal rise in temperature and the product can be manufactured and assembled conveniently.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A smart alarm plug, socket, wall-mounted socket or connector, comprising:

a casing, the casing being provided with a live wire pin, a neutral wire pin, a live wire connecting core wire and a neutral wire connecting core wire, the live wire pin being connected with the live wire connecting core wire, the neutral wire pin being connected with the neutral wire connecting core wire;

a normally-open temperature control switch which is reset automatically, the normally-open temperature control switch being disposed in the casing, the normally-open temperature control switch being connected between the live wire pin and the neutral wire pin;

a normally-closed temperature control switch which is reset manually, the normally-closed temperature control switch being disposed in the casing, the normally-closed temperature control switch being connected in series between the live wire pin and the live wire connecting core wire or between the neutral wire pin and the neutral wire connecting core wire, the normally-closed temperature control switch having a heat resistance value greater than that of the normally-open temperature control switch; and an alarm device used to send an alarm signal, the alarm device being disposed on the casing and connected in series with the normally-open temperature control switch.

2. The smart alarm plug, socket, wall-mounted socket or connector as claimed in claim 1, wherein the normally-open temperature control switch, the normally-closed temperature control switch and the alarm device are formed in the casing by injection or assembly.

3. The smart alarm plug, socket, wall-mounted socket or connector as claimed in claim 1, wherein the normally-open temperature control switch and the normally-closed temperature control switch are respectively attached to two sides of a rear end of the live wire pin.

4. The smart alarm plug, socket, wall-mounted socket or connector as claimed in claim 1, wherein the casing comprises an integrated box therein, a rear end of the live wire pin is located in the integrated box, the normally-open temperature control switch, the normally-closed temperature control switch and a portion of the alarm device are disposed in the integrated box, and another portion of the alarm device is located out of the integrated box.

5. The smart alarm plug, socket, wall-mounted socket or connector as claimed in claim 1, wherein the normally-open temperature control switch is attached to an outer side of a rear end of the neutral wire pin, the normally-closed temperature control switch is attached to an outer side of a rear end of the live wire pin, and the alarm device is located between the normally-open temperature control switch and the normally-closed temperature control switch.

6. The smart alarm plug, socket, wall-mounted socket or connector as claimed in claim 1, wherein the normally-open temperature control switch and the normally-closed temperature control switch are encapsulated together to form an integral temperature control switch, and the integral temperature control switch is attached to an outer side of a rear end of the live wire pin.

7. The smart alarm plug, socket, wall-mounted socket or connector as claimed in claim 1, wherein the heat resistance value of the normally-open temperature control switch is 55-65° C., and the heat-resistance value of the normally-closed temperature control switch is 70-85° C.

8. The smart alarm plug, socket, wall-mounted socket or connector as claimed in claim 1, further comprising an earth line pin and an earth wire connecting core wire, the earth wire pin and the earth wire connecting core wire being disposed on the casing, the earth wire pin being connected with the earth wire connecting core wire.

* * * * *